(12) United States Patent
Lu

(10) Patent No.: US 7,401,925 B2
(45) Date of Patent: Jul. 22, 2008

(54) IMAGE PROJECTION SYSTEM

(75) Inventor: Chien-feng Lu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 224 days.

(21) Appl. No.: 11/258,526

(22) Filed: Oct. 25, 2005

(65) Prior Publication Data
US 2006/0268237 A1    Nov. 30, 2006

(30) Foreign Application Priority Data
May 25, 2005    (TW) .............................. 94117147 A

(51) Int. Cl.
| | |
|---|---|
| *G03B 21/00* | (2006.01) |
| *G03B 21/20* | (2006.01) |
| *G03B 21/26* | (2006.01) |
| *G02F 1/1335* | (2006.01) |
| *H04N 5/74* | (2006.01) |
| *G02B 27/14* | (2006.01) |
| *G02B 27/12* | (2006.01) |
| *F21V 7/04* | (2006.01) |
| *H01L 33/00* | (2006.01) |

(52) U.S. Cl. .............................. 353/31; 353/33; 353/34; 353/84; 353/85; 353/94; 348/750; 348/757; 348/758; 348/771; 348/801; 349/8; 359/634; 359/638; 359/640; 362/231; 362/555; 362/800

(58) Field of Classification Search .................. 353/31, 353/29, 33, 34, 37, 81, 82, 84, 85, 86, 94, 353/98, 99; 348/739, 742, 744, 750, 757, 348/758, 759, 771, 801; 349/5, 7, 9, 8; 359/618, 359/629, 633, 634, 638–640; 362/227, 230, 362/231, 317, 341, 346, 555, 561, 612, 800
See application file for complete search history.

(56) References Cited

U.S. PATENT DOCUMENTS

| | | | |
|---|---|---|---|
| 5,580,142 A | * | 12/1996 | Kurematsu et al. ............ 353/31 |
| 6,545,814 B2 | | 4/2003 | Bartlett et al. |
| 6,726,329 B2 | | 4/2004 | Li et al. |
| 2003/0142275 A1 | * | 7/2003 | Yoshida ...................... 353/31 |

* cited by examiner

*Primary Examiner*—Rochelle-Ann Blackman

(57) ABSTRACT

An image projector system includes an LED controller and first and second LEDs, a dichroic mirror. The LED controller controls the first and the second LED to emit first and second color lights, respectively. The second color light is of high luminance and is decomposed by a dichroic mirror into third and forth color lights having luminance close to that of the first color light. Each color light is guided through a light valves to adjust the spectral transmittance of the color light. A light-combining device, such as an x-cube, receives and combines the first color light, the third color light, and the forth color light, to form light images, and transmits the images to a display through a projector lens.

20 Claims, 2 Drawing Sheets

IMAGE PROJECTION SYSTEM

BACKGROUND OF THE INVENTION

1. Field of the Invention

The present invention relates to an image projection system, and more particularly, to an image projection system having multiple color light sources.

2. Description of the Related Arts

Multimedia projectors usually use an ultra high performance lamp (UHP lamp) as a light source. The UHP lamp has advantages of high efficient and high luminance, which has good performance in the light flux of the projectors. However, the UHP has a very high energy consumption is very huge, which in turn generates a great amount of heat. The lifetime of the UHP lamp is often effected by the huge and intense heat and is thus short (about 1,000-3,000 Hours) so that it needs frequent maintenance and replacement. In addition, and the UHP lamp is so expensive that the overall cost of the projector is largely increased. Further, the UHP lamp is a white light source, and thus, the projector needs an additional color filter to decompose the white light into primary color lights in order to process chromatic signals. If the distribution of the white light in the color spectrum does not meet the requirement of the color balance, the projector has to restrain the high-luminance primary color light. This leads to a low efficiency of light utilization.

The current trends for the projector is "thinner, smarter, and smaller", with reduced amount of heat generated in order to improve the efficiency and the reliability. Light-emitting diodes (LEDs) are gaining advantages over the UHP as the main stream of light source for the projectors due to reduced amount of heat generation, low costs, and extended service life. Compared with the UHP lamps, the LED is much thinner and smaller than the UHP lamps, and the energy consumption of the LED is much lower. In addition, the LED is so endurable (more than 20,000 hours) that there is nearly no need for maintenance and replacement, and the light wave is adjustable.

However, the conventional projectors using LEDs as light sources surfer drawbacks of color shifting. The conventional projector uses three single primary color LEDs to generate primary color lights, which are then composed together to form chromatic images with a light-combining element. However, the LEDs of different colors have different luminance. The luminance of the red LED is usually larger than that of the green LED, and the luminance of the blue LED is the least. This causes problems of color shifting. Thus, the projector has to set light valve elements to adjust the luminance of the red LED and the green LED, which lows down the efficiency of light utilization.

Referring to FIG. 2 of the attached drawings, a conventional projector that employs LEDs as light sources is shown. The projector has a blue LED 102, a green LED 104, a red LED 106, an x-cube 108, and a projector lens 110. Each LED 102, 104, 106 emits a corresponding primary color light. The blue LED 102 emits a blue light (Bi); the green LED 104 emits a green light (Gi); and the red LED 106 emits a red light (Ri). These color lights propagate into the x-cube 108, which combines the color lights into chromatic images. As the luminance of the three LEDs is different from each other, the chromatic images generated by such a projector often suffer color unbalance.

Hence, an improved image projection system is required to overcome the disadvantages of the prior art.

SUMMARY OF THE INVENTION

An object of the present invention is to provide an image projector system, which solves the problem of color shifting caused by LED based light sources.

An image projector system in accordance with the present invention comprises an LED controller, first and second LEDs, a dichroic mirror, a plurality of liquid crystal light valves, an x-cube, and a projector lens. The LED controller controls the first and the second LEDs to emit a first color light and a second color light, respectively. The dichroic mirror is located in the path of the second color light, and decomposes the second color light into a third color light and a fourth color light. The liquid crystal light valves are respectively located in the paths of the first color light, the third color light, and the fourth color light to adjust the spectral transmittance of the color lights. The x-cube receives the first color light, the third color light, and the fourth color light, combines the color lights into light images, and transmits the light images to a display through the projector lens.

The present invention adopts the dichroic mirror to decompose a high-luminance second color light into the third color light and the fourth color light to match the luminance level of the first color light for effecting balance among different colors. To compare with the conventional devices, the present invention fully uses the second color light, and has good performance in efficiency.

Other objects, advantages, and novel features of the invention will become more apparent from the following detailed description of a preferred embodiment when taken in conjunction with the accompanying drawings, wherein:

DETAILED DESCRIPTION OF THE PREFFERRED EMBODIMENT

Figure 1:
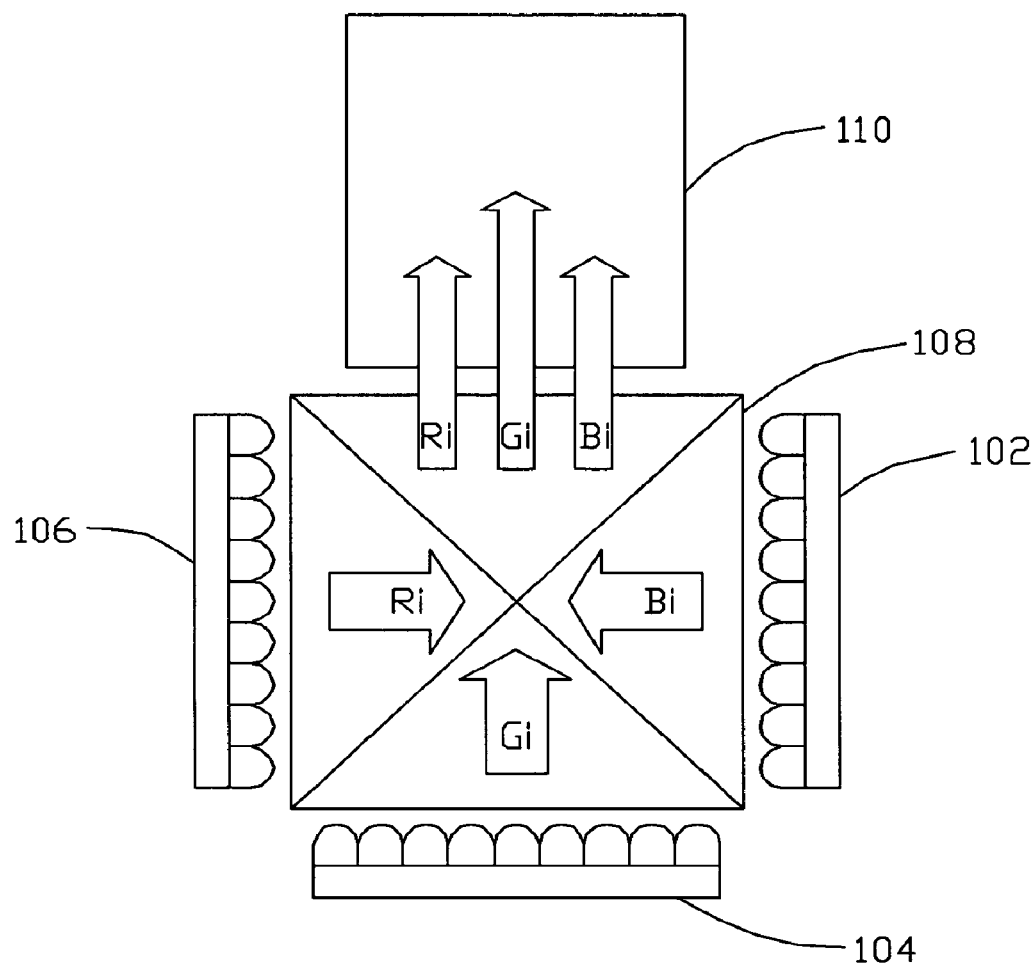
FIG. 1 is a schematic view showing a conventional projector.
Figure 2:
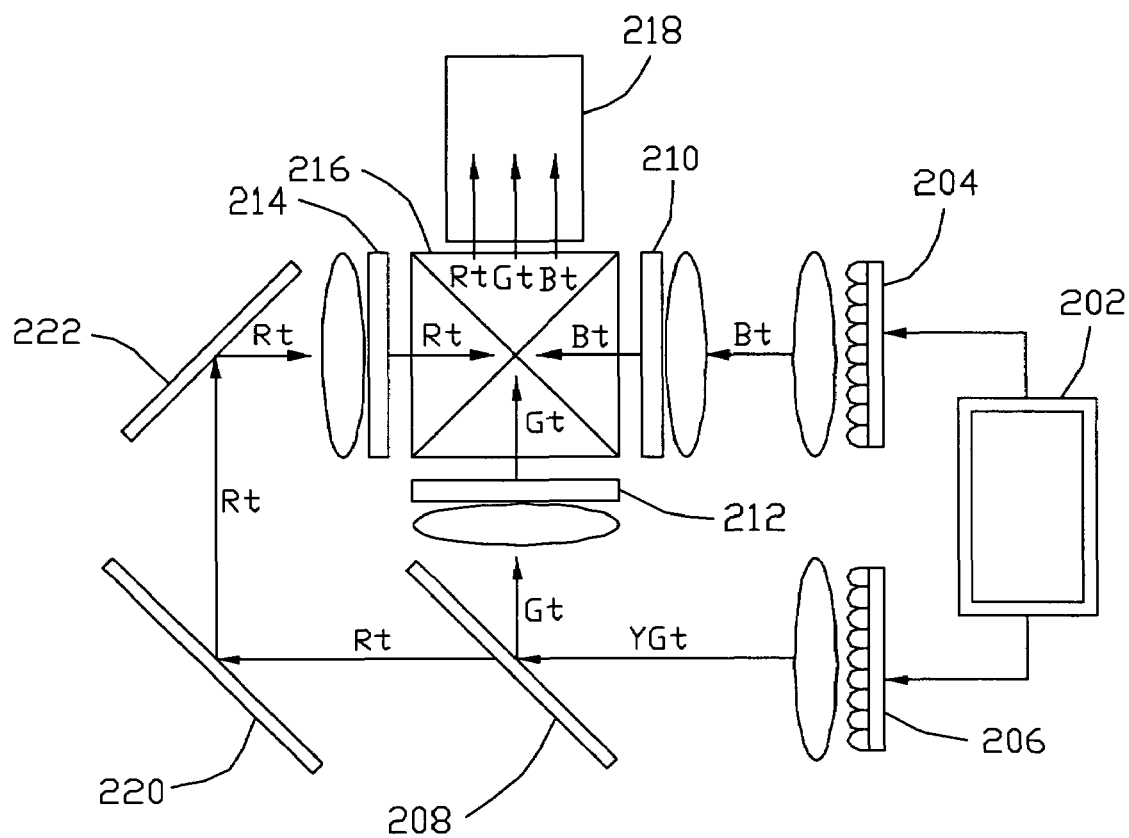
FIG. 2 is a schematic view of an image projector system constructed in accordance with the present invention.

With reference to the drawings and in particular to FIG. 1, an image projector system in accordance with the present invention comprises an LED controller 202, a first LED 204 emitting a blue light (Bt, first color light), a second LED 206 emitting a yellow-green light (YGt, second color light), a dichroic mirror 208 capable to decompose the yellow-green light into a green light (Gt, third color light) and a red light (Rt, fourth color light), a plurality of liquid crystal light valves 210, 212, 214 used to adjust the luminance of the color lights, an x-cube 216 that combines the different color lights, and a projector lens 218. The projector further comprises first and second mirrors 220, 222 to change the path of the red light.

The LED controller 202 is a diode driver, which drives the first and the second LEDs 204 and 206 to emit color lights. The LED controller 202 also controls the operation of the liquid crystal light valves 210, 212, 214. The blue light emitted from the first LED 202 directly propagates to the x-cube 216 through a first liquid crystal light valve 210. The liquid crystal light valves 210, 212, 214 each comprises a plurality of independent light valve elements, which control the spectral transmittance of the color lights to form desired chromatic images. The yellow-green light emitted from the second LED 206 has a higher luminance than the blue light. The yellow-green light propagates to the dichroic mirror 208, and is decomposed into the green light and the red light. The green light is re-directed to the second liquid crystal light valve 212, and is then transmitted to the x-cube 216. The red light transmits through the dichroic mirror 208, and redirected by the first and the second mirrors 220, 222 to travel through the third liquid crystal light valve 214, and then into the x-cube 216. The x-cube 216 combines the blue (first), the green (third), and the red (fourth) light into chromatic images, and sends the images to the projector lens 218.

The present invention adopts the dichroic mirror 208 to decompose the high-luminance yellow-green light into the green color light and the blue light. Thus, the three single primary color lights with substantially the same luminance can match each other to reach color balance. The light use efficiency is thus greatly improved.

It will be understood that the present invention may be embodied in other specific forms without departing from the spirit or central characteristics thereof. The present examples and embodiments, therefore, are to be considered in all respects illustrative and not restrictive, and the invention is not be limited to the details given herein.

What is claimed is:

1. An image projector system, comprising:
    an LED controller;
    a light source comprising a first LED and a second LED operatively coupled to and controlled by the LED controller to respectively emit a first color light consisting of one spectral component and a second color light consisting of two spectral components;
    a dichroic mirror arranged to receive and decompose the second color light into a third color light and a forth color light; and
    a light-combining element, which receives the first color light passing through a first light valve, the third color light passing through a second light valve, and the forth color light passing through a third light valve, and combines the color lights to form images;
    wherein the LED controller drives the first and second LEDs to respectively emit the first and second color lights and also controls the operation of the first, second and third light valves.

2. The image projector system as claimed in the claim 1 further comprising a projector lens, which receives the images from the light-combining element and projects the images to a display.

3. The image projector system as claimed in the claim 1, wherein the first color light emitted from the first LED comprises a blue light.

4. The image projector system as claimed in the claim 1, wherein the second color light emitted from the second LED comprises a yellow-green light, which is decomposed by the dichroic mirror into a green light serving as the third color light, and a red light serving as the forth color light.

5. The image projector system as claimed in the claim 1, wherein the light-combining element comprises an x-cube.

6. The image projector system as claimed in the claim 1 further comprising at least one minor to redirect at least one of the color lights toward the light-combining element.

7. The image projector system as claimed in the claim 1 further comprising a light valve that controls spectral transmittance of each color light toward the light-combining element.

8. The image projector system as claimed in the claim 7, wherein the light valve comprises a liquid crystal light valve comprising a plurality of independent light valve elements.

9. The image projector system as claimed in claim 1, wherein the LED controller is a diode driver.

10. The image projector system as claimed in claim 1, wherein the first and forth color lights enter the light-combining element in opposite directions.

11. An image projector device, comprising:
    a light source controller;
    a first light source operatively coupled to and controlled by the light source controller to emit a first color light consisting of one spectral component;
    a second light source operatively coupled to and controlled by the light source controller to emit a second color light consisting of two spectral components;
    a dichroic beam splitter, which receives and decomposes the second color light into a third color light and a forth color light; and
    a light-combining element which receives and combines the first color light passing through a first light valve, the third color light passing through a second light valve, and the forth color light passing through a third light valve to form images;
    wherein the first and fourth color lights enter the light-combining element in opposite directions.

12. The image projector device as claimed in claim 11, wherein the first light source comprises a blue light LED, which emits blue light as the first color light.

13. The image projector device as claimed in claim 11, wherein the second light source comprises a yellow-green light LED, which emits a yellow-green light as the second color light and wherein the second color light is decomposed into green light and red light as the third color light and the fourth color light respectively.

14. The image projector device as claimed in claim 11, wherein the dichroic beam splitter comprises a dichroic minor.

15. The image projector device as claimed in claim 11 further comprising a light valve controlling spectral transmittance of each color light toward the light-combining element.

16. The image projector device as claimed in claim 15, wherein each light valve comprises a liquid crystal light valve that is comprised of a plurality of independent light valve elements to control the spectral transmittance of the color lights.

17. The image projector device as claimed in claim 11, wherein the light-combining element comprises an x-cube, which propagates the light images to a display through a projector lens.

18. The image projector device as claimed in claim 11 further comprising at least one minor to redirect at least one of the color lights toward the light-combining element.

19. The image projector device as claimed in claim 11, wherein the first light source comprises a first LED, the second light source comprises a second LED, and the light source controller is a diode driver.

20. The image projector device as claimed in claim 19, wherein the diode driver drives the first and second LEDs to respectively emit the first and second color lights and also controls the operation of the first, second and third light valves.

* * * * *